H. M. DUDLEY.
DYEING DEVICE.
APPLICATION FILED JAN. 7, 1918.

1,327,661.

Patented Jan. 13, 1920.
9 SHEETS—SHEET 1.

H. M. DUDLEY.
DYEING DEVICE.
APPLICATION FILED JAN. 7, 1918.

1,327,661.

Patented Jan. 13, 1920.
9 SHEETS—SHEET 3.

Inventor.
Howard M. Dudley
By his Attorney

H. M. DUDLEY.
DYEING DEVICE.
APPLICATION FILED JAN. 7, 1918.

1,327,661.

Patented Jan. 13, 1920.
9 SHEETS—SHEET 4.

H. M. DUDLEY.
DYEING DEVICE.
APPLICATION FILED JAN. 7, 1918.

1,327,661.

Patented Jan. 13, 1920.
9 SHEETS—SHEET 8.

UNITED STATES PATENT OFFICE.

HOWARD M. DUDLEY, OF PHILADELPHIA, PENNSYLVANIA.

DYEING DEVICE.

1,327,661. Specification of Letters Patent. Patented Jan. 13, 1920.

Application filed January 7, 1918. Serial No. 210,619.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Dyeing Devices, of which the following is a full, clear, and exact specification.

My invention relates to dyeing devices and refers particularly to those devices suitable for dyeing wound fabrics with dyeing liquids.

One object of my invention is a device whereby a series of wound fabrics may be subjected simultaneously to equal and uniform treatment with dyeing liquids.

Another object of my invention is a device in which fabric of any width may be subjected to equal and uniform treatment with dyeing liquids.

Another object of my invention is a device in which a dyeing liquid may be passed in opposite directions through a series of wound fabrics to produce even and uniform results.

Another object of my invention is a device in which wound fabric may be maintained in a fixed position during the passage of a liquid through it in opposite directions.

Another object of my invention is a device in which the condition of the fabric may be determined without opening the device, interrupting the operation or disturbing the fabric.

These and other objects of the device of my invention will be evident upon a consideration of my specification, drawings and claims.

A number of difficulties present themselves in the dyeing of wound fabrics. All portions of the fabric must receive equal treatment in order that the interior, exterior and edges of the fabric may be uniform, equal penetration must exist in all parts, and the device must be capable of treating fabric of varying widths. In addition to these requirements, it is advantageous to treat a number of wound fabrics simultaneously in order to save time and labor and insure uniformity of results. Further, it is essential that the condition of the treated fabric be capable of judgment from time to time without disturbing the fabric or interrupting the operation.

The device of my invention accomplishes all of these desirable results and presents a method whereby a number of fabrics of varying widths may be dyed equally and uniformly in a simple, rapid and economical manner, and the treated condition observed without interrupting the operation or disturbing the fabric.

In the particular form of the device of my invention, shown in the accompanying drawings, similar parts are designated by similar numerals:—

The particular form of my device illustrated in the accompanying drawings comprises a series of tubular members or fabric chambers formed by the cylindrical walls 20, 20, 20. The upper portions of the walls 20, 20, exterior of the fabric chambers, are connected by a plate 21, and the lower portions of the walls 20, 20, exterior of the fabric chambers, are connected by a plate 22. This portion of the device, therefore, being comprised of the two parallel spaced plates 21 and 22 between which extend a series of fabric chambers open at their tops and bottoms. The plate 21 has an upwardly extended annular member 23, to which is attached the cover 24 by means of the bolts 25, 25, the cover 24 carrying the screw-eyes 26, 26 for the insertion of hooks for the removal of the cover 24. The plate 22 has a downwardly extended annual member 27 to which is attached the downwardly converging member 28 by means of the bolts 29, 29. The member 28 is formed by the wall 30 which carries the annual flange member 31. The flange 31 is attached to the wall 32 of the downwardly converging member 33 by means of the bolts 34, 34. The wall 32 of the member 33 is attached to the two-way valve 35 by means of the bolts 36, 36.

Figure 9:
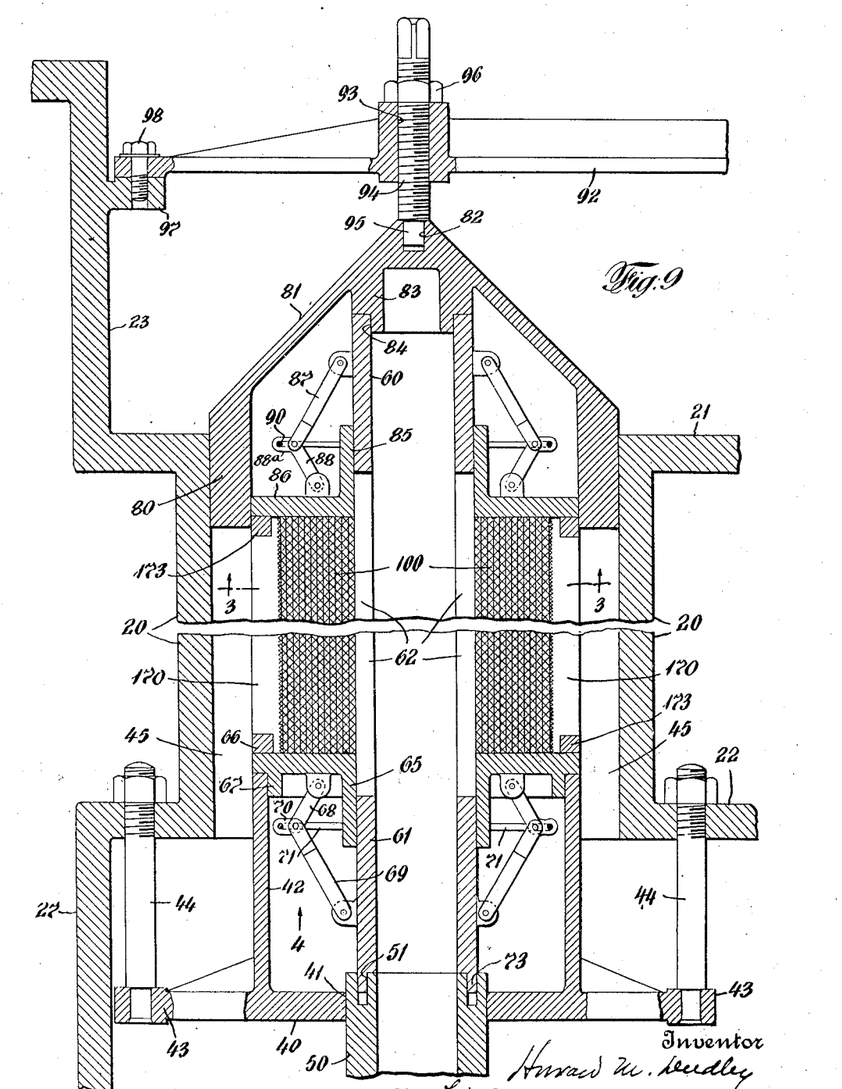
Fig. 9 is a fragmental enlarged detail view in cross-section of one reel beam and its adjacent parts.
Figures 11, 12, 13:
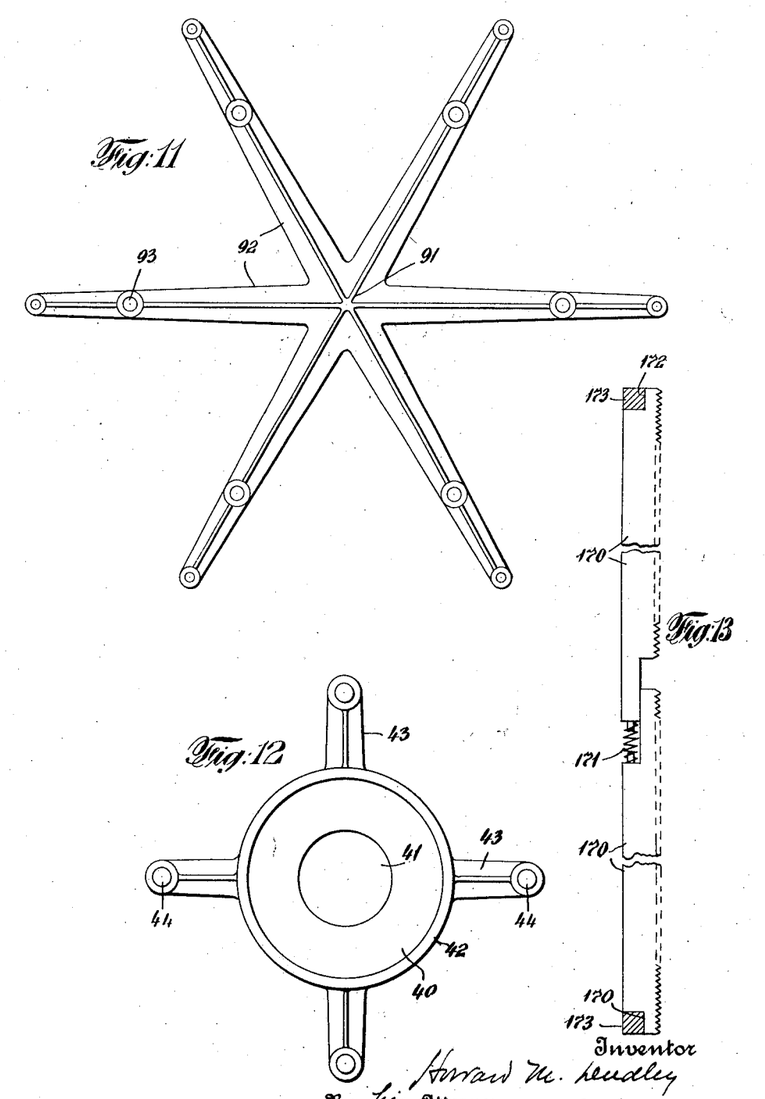
Fig. 11 is a plan view of the top spider.
Fig. 12 is a plan view of the bottom spider.
Fig. 13 is a detached side view of one blade of the cover.

Suspended from the plate 22 is a series of spiders (shown particularly in Figs. 9 and 12) comprising a plate 40 with a central opening 41 and an upwardly extended annular member 42, the whole being carried by the arms 43, 43, which are attached to the plate 22 by means of the bolts 44, 44 as indicated in Fig. 9. One of these spiders is situated below each fabric chamber so that the opening 41 is centrally situated as respect to the fabric chamber and the member 42 will allow the space 45 between it and the wall 20 of the fabric chamber. A pipe 50 extends through the central opening 41 of each spider making a tight joint therewith and then extends downwardly into the chamber 33. The upper portion of each pipe 50 has an annular recess 51 in its upper end and an expanded portion 52 at its lower end. Each fabric chamber is capable of carrying a fabric reel which is comprised of a cylindrical core, the end portions 60, 61 of which are imperforate while the central portion 61 is foraminous, the foraminous central portion being formed by a series of diamond-shaped bars 63, 63, the longer diameters of which extend outwardly from the center of the core. Longitudinally slidable along the core member 61, and forming a water-tight abutment therewith, is the annual member 65 with an extended annular portion 66 carrying the extended annular portion 67, the latter forming a water-tight joint with the member 42 of the spider. A series of link systems 68, 69 is pivotally attached to the members 66 and 61. The portion 70 of each link 68 has an opening through which the wire 71 is passed, the ends of the wire 71 being connected by the right and left turn-buckle 72. The tightening of the wire 71 by means of the turn-buckle 72 will cause an inward pivotal movement of the link systems 68, 69, thus sliding the members 65, 66, 67 inwardly along the fabric core. The core portion 61 has an extended annular portion 73 at its lower end capable of insertion within the recess 51 of the pipe 50, forming a water-tight engagement therewith. The members 40, 42, 67, 66, 65, 61 and 50 therefore form a water-tight chamber preventing water from coming into contact wth the series of link systems 68, 69.

Slidable within each fabric chamber is a top comprising the annular portion 80, which slides within the walls 20 of the fabric chamber and forms a water-tight joint therewith, and the upwardly converging member 81, having a recess 82 in the top thereof and carrying the member 83 which has the offset 84 capable of making a water-tight joint with the core member 60.

Longitudinally slidable along the core member 60 is the annular member 85 capable of forming a water-tight joint therewith and the annular member 86 integral with the member 85 and capable of making a water-tight joint with the member 80. A series of link systems 87, 88 pivotally connect the members 60 and 86, and the portion 88ᴬ of the member 88 has an opening through which the wire 90 is passed, the two ends of the wire having a turn-buckle similar to and for the purposes mentioned above in regard to the wire 71 and the turn-buckle 72.

The tops 80, 81 are capable of slidable movement within the fabric chambers by means of a top spider 91 comprising a series of arms 92, 92 extending over the fabric chambers. Within each arm 92 is a threaded opening 93, into which is threaded the thread-bolt 94, the lower end 95 of which is capable of placement within the recess 82 of the top 81, the lock nut 96 being employed to maintain the top in any desired position within the fabric chamber. The spider 91 is fixedly attached to the annular member 97 of the wall 23 by means of the bolts 98, 98.

Figure 10:
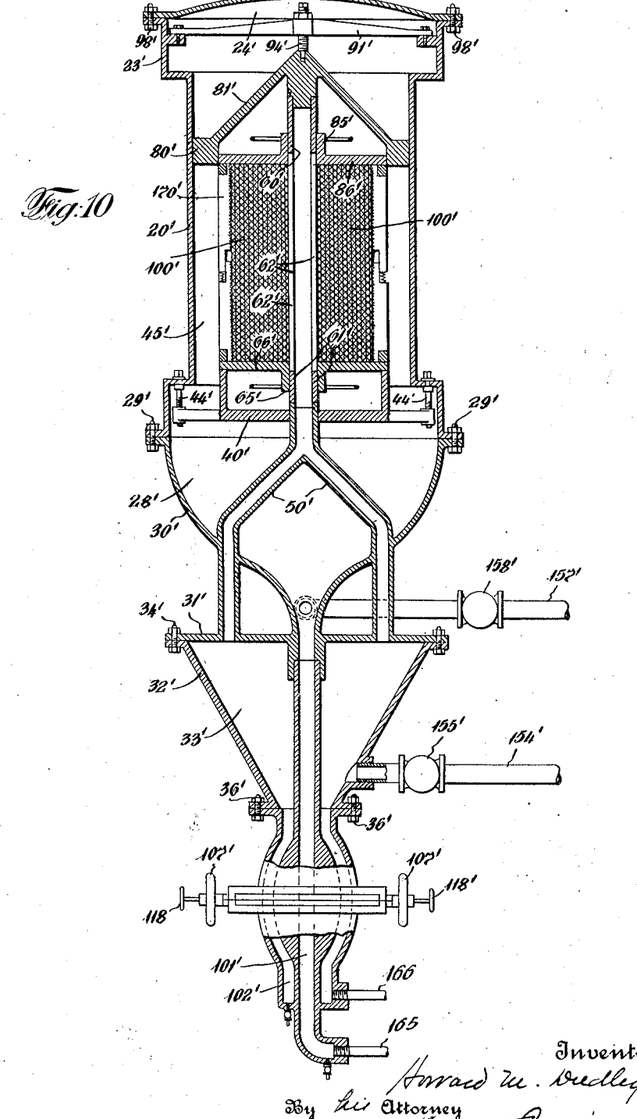
Fig. 10 is an enlarged cross-section of a testing device.

A series of testing devices each of which is similar and proportionate to, and exterior of, the larger device, each comprising one fabric chamber, is attached to the larger device in such a manner that the treatment of fabric in the larger device and of that in the testing device will be equal. In Fig. 10, illustrating one of these devices, parts similar to those in the larger device are designated by prime numerals.

Figure 1:
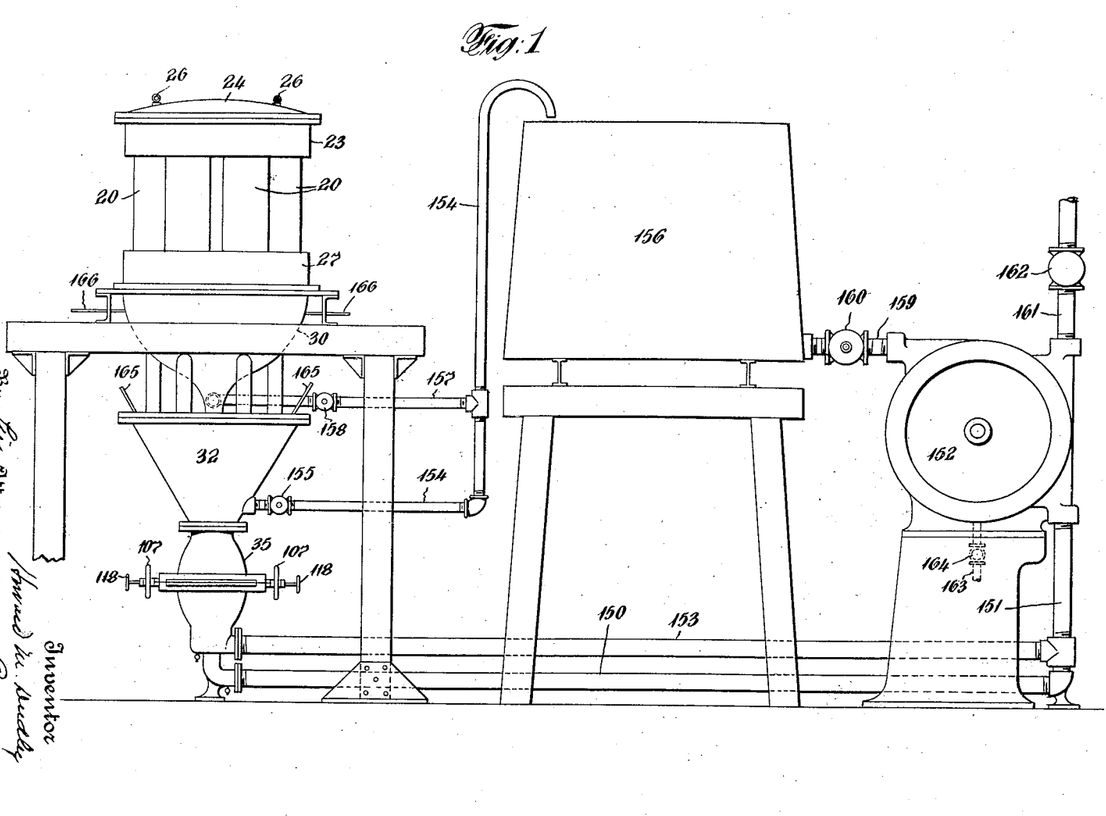
Figure 1 is a diagrammatic view of a device of my invention with testing devices removed for clearness.
Figure 2:
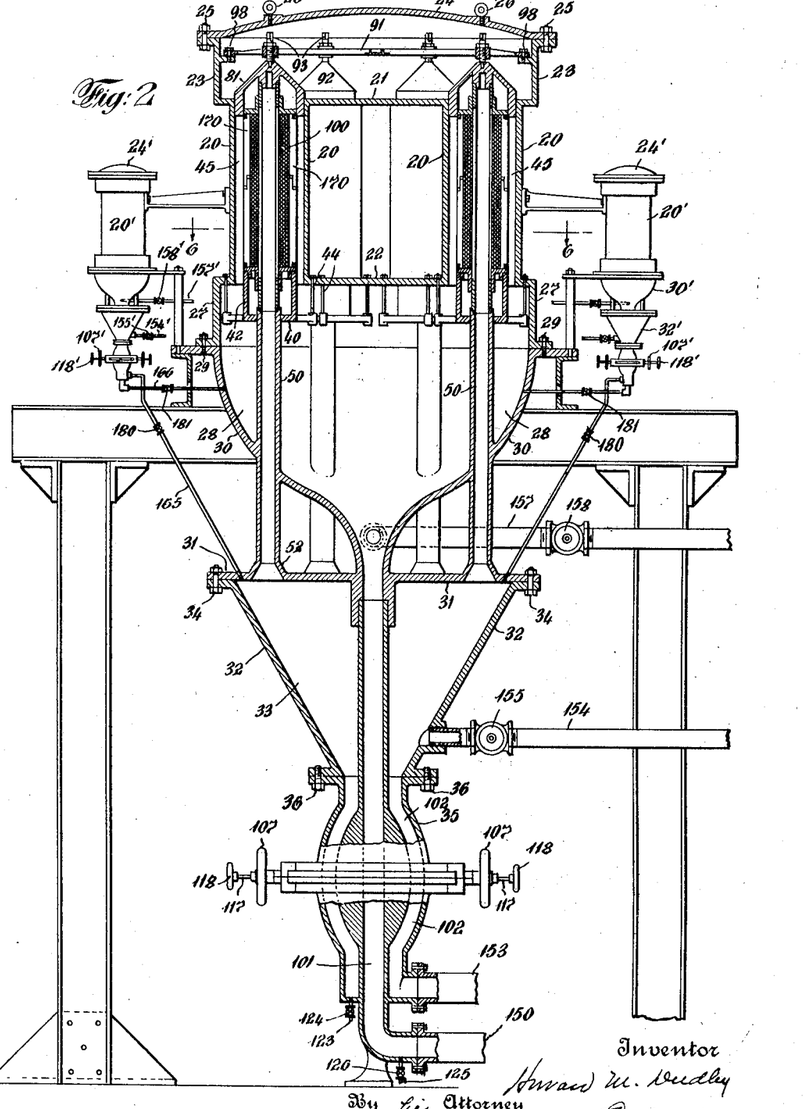
Fig. 2 is a longitudinal cross-section of a portion of my device.
Figure 3:
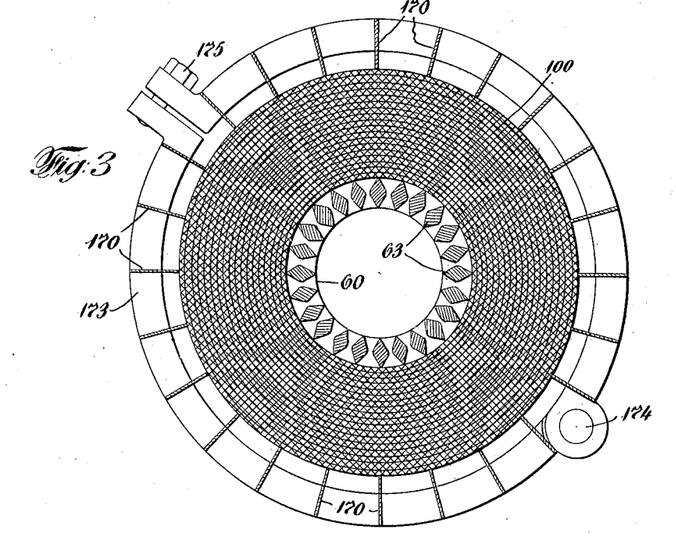
Fig. 3 is a section through the line 3—3 of Fig. 9 with casing omitted.
Figure 4:
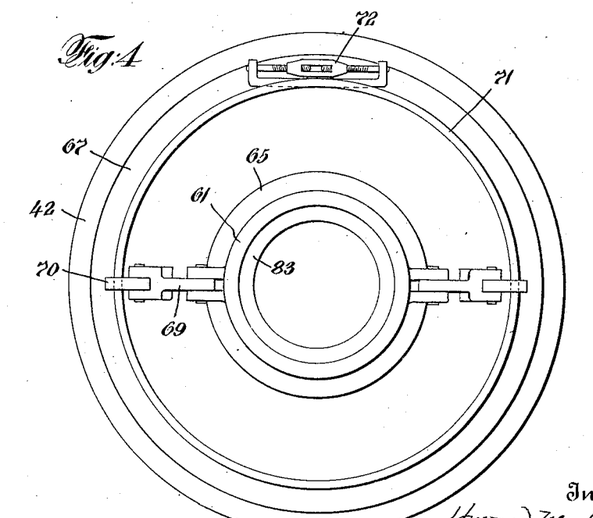
Fig. 4 is an end view of reel beam in the direction of the arrow 4 of Fig. 9.
Figure 5:
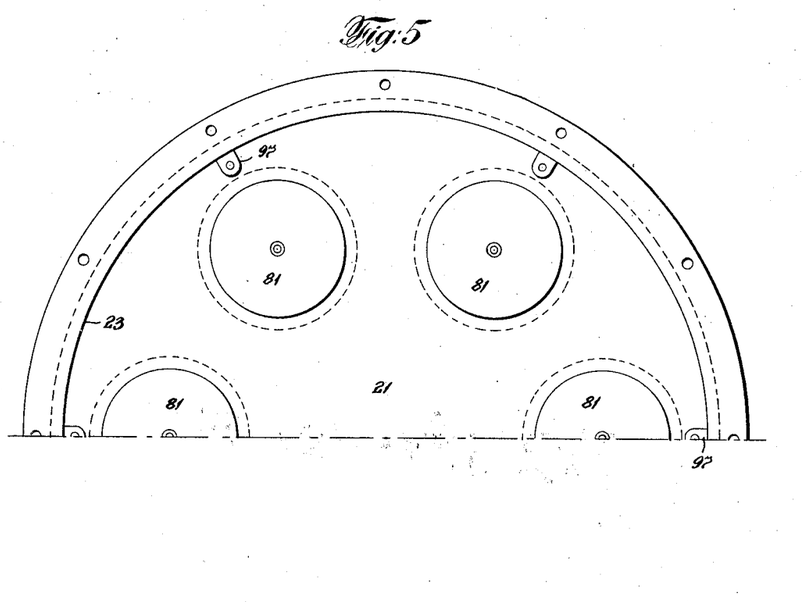
Fig. 5 is a broken top view with material, cover and spider removed.
Figure 6:
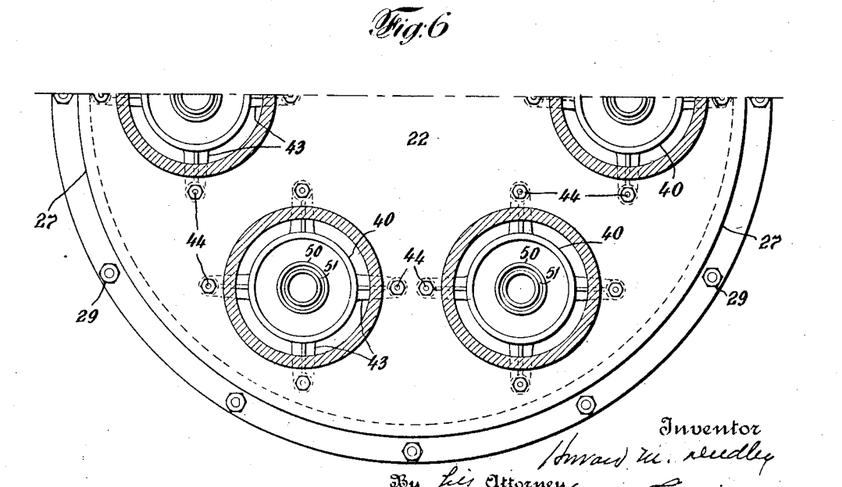
Fig. 6 is a cross-section through the line 6—6 of Fig. 2 with reel beams removed.
Figure 7:
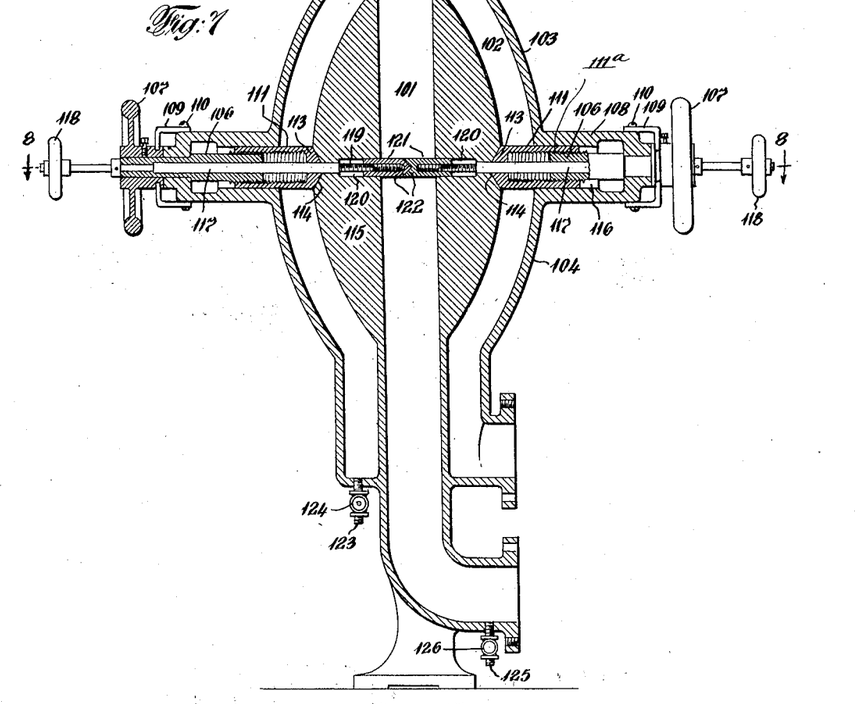
Fig. 7 is a broken cross-section of the two-way valve.
Figure 8:
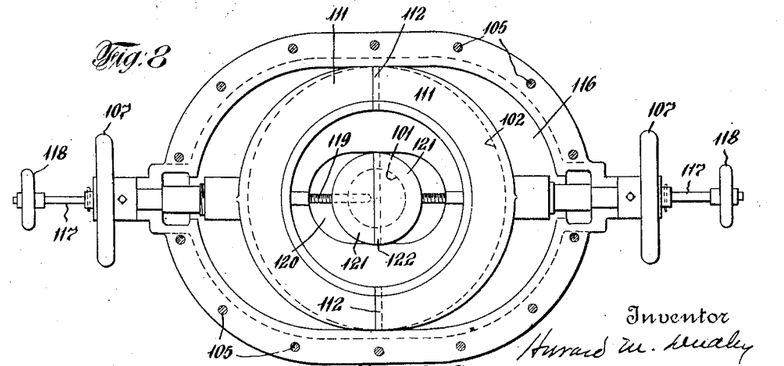
Fig. 8 is a section through the line 8—8 of Fig. 7.

The two-way valve shown in detail in Figs. 7 and 8, comprises the two liquid carrying chambers 101 and 102. The valve consists of the upper portion 103 and the lower portion 104 bolted together by the bolts 105, 105. Within each valve body extension 108 is a hollow exteriorly threaded member 106 fixedly attached to the valve wheel 107 abutting upon the extension 108, the wheel 107 being maintained from outward movement by the catches 109, 109 fixedly attached to the extension 108 by the screw bolts 110, 110 and setting within holes in the collar portion of the wheel 107. The passage 102 of the valve is capable of being closed by two semi-circular plates 111, 111, each having an interiorly threaded member 111ᴬ capable of meshment with a member 106, the meeting ends 112, 112 of the plates 111, 111 forming a tight joint by means of dove-tailing one within the other. The inner edges 113, 113 of the valve plates 111, 111 are angled to fit within a similar recess 114 within the body 115 of the valve in order to produce a tight joint. The plates 111, 111, when withdrawn to allow the opening of the passage 102, pass into the chamber 116. The turning of the wheel 107 will therefore open and close the passage 102.

A valve stem 117, connected at its outer end with the wheel 118, passes through the central opening of the member 106 and has its interior end 119 exteriorly threaded. Slidable within the chamber 120 are two plates 121, 121, each having an interiorly threaded opening to mesh with the threads 119. The abutting edges 122, 122 of the plates 121, 121 are dove tailed to produce a tight joint. The revolution of the wheel 118 therefore opens and closes the passage 101. A pipe 123, carrying the valve 124, can be used to drain the passage 102, and the pipe 125, carrying the valve 126, can be used to drain the passage 101.

Connected to the passage 101 of the valve is the pipe 150 connected to the pipe 151 which in turn is connected to the delivering chamber of the pump 152. The passage 102 of the valve is connected to the pipe 153 which is connected to the pipe 151. The chamber 33 is connected to the pipe 154, carrying the valve 155, which opens into the top of the reserve tank 156. The lower portion of the chamber 28 is connected to the pipe 154 by the pipe 157 carrying the valve 158. The bottom of the reserve tank 156 is connected to the receiving chamber of the pump 152 by the pipe 159 carrying the valve 160. The pipe 161, carrying the valve 162, connects the receiving chamber of the pump 152 with a dissolving or supply tank not shown. The pipe 163, carrying the valve 164, connects the delivering chamber of the pump 152 with a fresh water supply not shown. The pipe 165, carrying the valve 180, connects the chamber 33 with the passage 102' of the testing device, and the pipe 166, carrying the valve 181, connects the chamber 28 with the passage 101' of the testing device. The pipes 154' and 157' empty into the top of the reserve tank 156.

The operation of the device is as follows, the cover 24 being removed and the fabric chambers empty:—

The first operation is to wind the fabric upon a core and prepare a reel for insertion in each fabric chamber. This is accomplished by winding the fabric 100 upon the foraminous portion 62 of the core. The members 65 and 85 are then slidably moved along the core until the members 66 and 86 abut firmly upon the edges of the wound fabric, this being accomplished by turning the two turn-buckles 72, 72, the wires 71 and 91 operating the two link series 68, 69 and 87, 88. The wound fabric is then held firmly in place by means of a series of serrated blades 170, 170, each comprising two members overlapping each other at their inner ends and being held together by a spiral spring 171 to allow of a change in their length necessary to the varying widths of the fabric. The outer ends of the blades 170, 170 have offsets 172, 172, into which is filled a band 173 of two pieces hinged at 174, and connected at their other ends by screw bolts 175, 175. The series of blades 170, 170 is placed between the two members 173, 173, and the serrated edges pressed firmly upon the fabric by means of the screw bolts 175, 175.

A reel thus prepared is then placed in each fabric chamber. The member 73 is placed within the recess 51. The member 42 raised to abut upon 66, if necessary, and the top 81 is placed over the reel in such a manner that the member 83 abuts upon the member 60. When each fabric chamber is thus loaded the spider 91 is fastened to the annular member 97, and the bolts 94, 94 screwed inwardly until the reel is held firmly in place. The cover 24 is then fastened in position. The testing devices are then similarly loaded with fabric 100'.

All of the valves are closed with the exception of valves 162, 121, 155, 181, 121' and 155' and the pump 152 started. The liquid then passes from the dissolving tank, not shown, through the pipe 161, the pump 152, the pipes 151, 150, the passage 101, the chamber 28, the chambers 45, 45 inwardly through the fabric 100 into the hollow core and thence through the pipe 50, the chamber 33 and the pipe 154 into the reserve tank 156. When sufficient liquid has been introduced into the reserve tank, the valve 162 is closed and valve 160 opened, the liquid then having a continuous flow as indicated above. At the same time the liquid has passed through the pipes 166, 166, the testing devices and the pipe 154' into the reserve tank.

When it is desired to reverse the flow of the liquid, valves 121, 155, 181, 121' and 155' are closed and valves 111, 158, 180, 111' and 158' are opened. The liquid then passes from the pump 152 through the pipes 151, 153, passage 102, chamber 33, pipes 50, 50 into the center of each core from which it passes outwardly through the fabric 100 into the chambers 45, 45, chamber 28 and pipe 157 into the reserve tank 156 from whence it passes through the pipe 159 to the pump 152 for continuous circulation. At the same time the liquid passes simultaneously through the testing devices.

Figure 14:
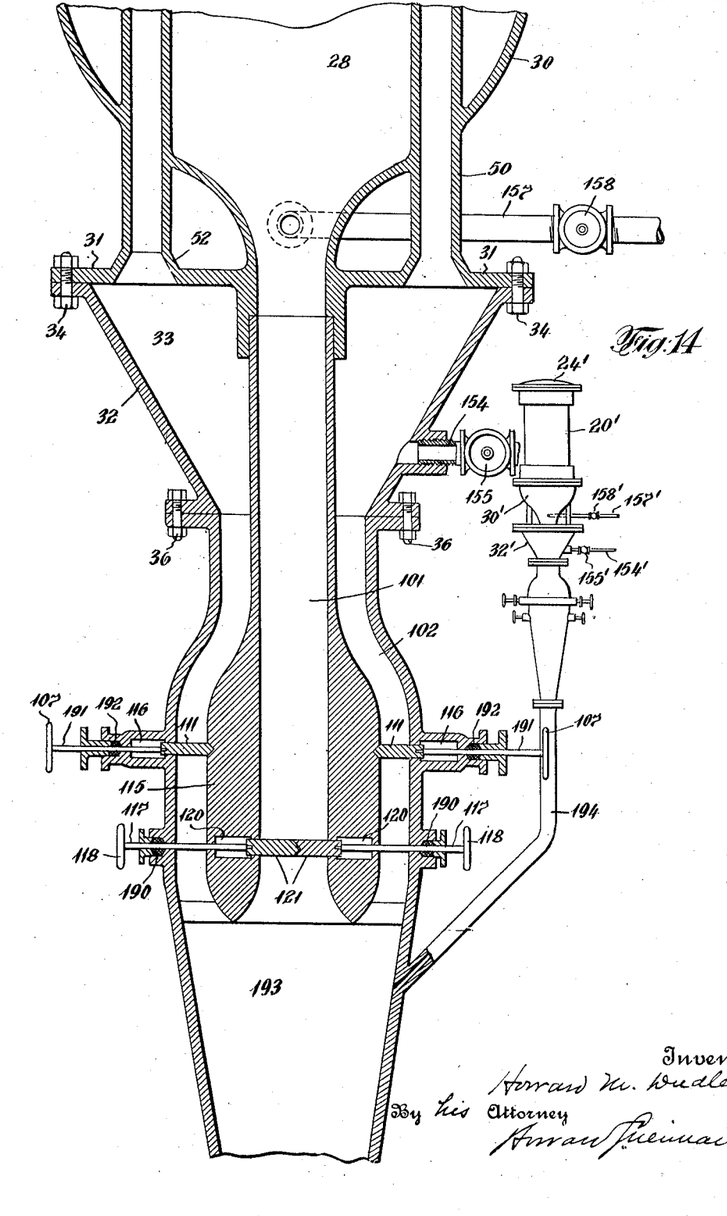
Fig. 14 is a modification of the two-way valve.

In the modification of the valve shown in Fig. 14, the plates 121, 121 are connected to the valve stems 117, 117, which are slidable through the stuffing boxes 190, 190, and the plates 111, 111 are connected to the valve stems 191, 191, which are slidable through the stuffing boxes 192, 192. In this modification of the valve, the passages 101 and 102 are opened or closed by the slidable movement of the valve stems 117 and 191. The valve chamber 193 is directly connected with the delivering chamber of the pump 152. The testing device is connected to the chamber 193 by the pipe 194.

In the modification, thus disclosed, the liquid may be passed upwardly through the tubes 50, 50 and thence outwardly through the fiber by opening the valves 111, 111 and closing the valves 121, 121, thus allowing the liquid to pass through the chamber 193 and the passage way 102. The liquid may be passed through the chamber 28 and inwardly through the fiber by closing valves 111, 111 and opening valves 121, 121, thus allowing the liquid to pass through the chamber 193 and the passage way 101.

If, at any time, it is desirous of determining the condition of the treated fabric, without interrupting the operation, the valves 180 and 181 are closed, the testing device opened and the fabric examined. Water or other liquids may be introduced through the pipe 163.

I do not limit myself to the particular size, shape, number or arrangement of parts described and shown, all of which may be varied without going beyond the scope of my invention as described and claimed.

What I claim is:—

1. In a fabric treating device, in combination, a series of fabric chambers with imperforate side walls, a series of hollow foraminous fabric reels capable of placement within the fabric chambers, means for closing the upper end of each fabric chamber and hollow reel, a liquid chamber connected to the lower ends of the hollow reels, a liquid chamber connected to the lower ends of the fabric chambers and means for passing a liquid in opposite directions through the device and fabric wound upon the reels.

2. In a fabric treating device, in combination, a series of fabric chambers with imperforate side walls, a series of hollow foraminous fabric reels capable of placement within the fabric chambers, means for closing a predetermined portion of the foraminous reel, means for closing the upper end of each fabric chamber, means for closing the upper end of each hollow reel, means for maintaining each wound reel spaced from the side wall of its fabric chamber, a liquid chamber connected to the lower ends of the hollow reels, a liquid chamber connected to the lower ends of the fabric chambers and means whereby a liquid may be passed continuously in either direction through the two liquid chambers and fabric wound upon the reels.

3. In a fabric treating device, in combination, a series of fabric chambers with imperforate side walls, a series of hollow foraminous fabric reels capable of placement within the fabric chambers, means for closing a predetermined portion of the foraminous reel, foraminous means abutable upon the outer surface of fabric wound upon the reel, means for closing the upper end of each fabric chamber, means for closing the upper end of each hollow reel, means for maintaining each wound reel spaced from the side wall of its fabric chamber, a liquid chamber connected to the lower ends of the hollow reels, a liquid chamber connected to the lower ends of the fabric chambers, a pump connected to the two liquid chambers, a reserve tank connected to the pump and means whereby the pump will pass a liquid from the reserve tank in opposite directions through fabric wound upon the reel.

4. In a fabric treating device, in combination, a series of fabric chambers with imperforate side walls, a series of hollow foraminous fabric reels capable of placement within the fabric chambers, means for closing a predetermined portion of each foraminous reel, means for closing the one end of each hollow core, means for maintaining each core within a fabric chamber spaced from the wall thereof, means for closing one end of the space between each reel and fabric chamber side wall, a chamber connecting the open ends of the hollow reels, a chamber connecting the open ends of the spaces between the reel and the fabric chamber walls and means for passing a liquid in opposite directions through fabric wound upon the reels.

5. In a fabric treating device, in combination, a series of fabric chambers with imperforate side walls and closed at one end, a series of hollow foraminous fabric reels closed at one end each comprising a series of parallel spaced bars capable of placement within the fabric chambers, means for closing a predetermined portion of each foraminous reel, foraminous means abutable upon the outer surface of fabric wound upon each reel, means for maintaining each reel in a fabric chamber, and means for passing a liquid in opposite directions through fabric wound upon the reels.

6. In a fabric treating device, in combination, a series of fabric chambers with imperforate side walls and closed at one end, a series of hollow foraminous fabric reels closed at one end each comprising a series of parallel spaced bars capable of placement within the fabric chambers, means for closing a predetermined portion of each foraminous reel, foraminous means abutable upon the outer surface of fabric wound upon each reel, means for maintaining each reel in a fabric chamber, a liquid chamber connecting the open ends of the hollow cores, a liquid chamber connecting the open ends of the fabric chambers, and means for passing a liquid in opposite directions through the liquid chambers and fabric wound upon the reels.

7. In a fabric treating device, in combination, a series of fabric chambers with imperforate side walls and closed at one end, a series of hollow foraminous fabric reels closed at one end, each comprising a series of parallel spaced bars capable of placement within the fabric chambers, means for closing a predetermined portion of each foraminous reel, foraminous means abutable upon the outer surface of fabric wound upon each reel, means for maintaining each reel in a fabric chamber, a liquid chamber connecting the open ends of the hollow cores, a liquid chamber connecting the open ends of the fabric chambers, a pump, means connecting the liquid chambers with the pump, a reserve tank and means connecting the reserve tank with the pump to allow of the continuous circulation of a liquid from the reserve tank in opposite directions through the liquid chambers and fabric wound upon the reels.

8. In a fabric treating device, in combination, a series of fabric chambers with imperforate side walls, a series of hollow foraminous fabric reels each comprising a series of parallel spaced bars capable of placement within the fabric chambers, means for closing a predetermined portion of each foraminous reel, foraminous means abutable upon the outer surface of fabric wound upon each reel, means for maintaining each reel in a fabric chamber spaced from the side wall thereof, for passing a liquid into the hollow core of each reel and outwardly through fabric wound thereon, means whereby a liquid passed into the space between each reel and the fabric chamber wall will pass inwardly through fabric wound thereon and means for the continuous circulation of a liquid in opposite directions through the fabric.

Signed at New York city in the county of New York and State of New York this 31st day of December, 1917.

HOWARD M. DUDLEY.